(12) United States Patent
Kwon et al.

(10) Patent No.: US 8,942,155 B2
(45) Date of Patent: Jan. 27, 2015

(54) DATA TRANSMITTING METHOD FOR MACHINE TYPE COMMUNICATION SERVICE AND MOBILE COMMUNICATION SYSTEM USING THE SAME

(75) Inventors: Hye Yeon Kwon, Daejeon (KR); Ae Soon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 398 days.

(21) Appl. No.: 13/334,551

(22) Filed: Dec. 22, 2011

(65) Prior Publication Data

US 2012/0163271 A1    Jun. 28, 2012

(30) Foreign Application Priority Data

Dec. 22, 2010   (KR) .................. 10-2010-0132861

(51) Int. Cl.
    *H04W 4/06* (2009.01)
    *H04W 4/00* (2009.01)
(52) U.S. Cl.
    CPC ............... *H04W 4/06* (2013.01); *H04W 4/005* (2013.01)
    USPC .......................................... 370/312; 370/342
(58) Field of Classification Search
    None
    See application file for complete search history.

(56) References Cited

U.S. PATENT DOCUMENTS

| | | | |
|---|---|---|---|
| 6,434,626 B1 * | 8/2002 | Prakash et al. ............. 709/238 |
| 7,751,358 B2 | 7/2010 | Kuure et al. | |
| 8,472,377 B2 * | 6/2013 | Becker et al. .............. 370/328 |
| 2003/0134653 A1 * | 7/2003 | Sarkkinen et al. .......... 455/517 |
| 2004/0029596 A1 * | 2/2004 | Kim et al. .................. 455/458 |
| 2004/0109428 A1 * | 6/2004 | Krishnamurthy ............ 370/338 |
| 2005/0054344 A1 * | 3/2005 | Jung et al. ................ 455/432.3 |
| 2006/0109812 A1 * | 5/2006 | Kim et al. .................. 370/329 |
| 2007/0232308 A1 * | 10/2007 | Bergstrom et al. .......... 455/436 |
| 2008/0057989 A1 * | 3/2008 | Kuo .......................... 455/466 |
| 2009/0180417 A1 * | 7/2009 | Frost et al. ................ 370/312 |
| 2010/0067405 A1 * | 3/2010 | Kanazawa et al. .......... 370/254 |
| 2010/0150049 A1 * | 6/2010 | Kim et al. .................. 370/312 |
| 2010/0165905 A1 * | 7/2010 | Kanazawa et al. .......... 370/312 |
| 2010/0220602 A1 * | 9/2010 | Abdel-Kader .............. 370/248 |
| 2010/0322128 A1 * | 12/2010 | Becker et al. .............. 370/312 |
| 2012/0008573 A1 * | 1/2012 | Shiva et al. ................ 370/329 |
| 2012/0252481 A1 * | 10/2012 | Anpat et al. ............... 455/456.1 |
| 2014/0079038 A1 * | 3/2014 | Maeda et al. ............... 370/336 |

FOREIGN PATENT DOCUMENTS

KR    1020050107066    11/2005

* cited by examiner

*Primary Examiner* — Bunjob Jaroenchonwanit
(74) *Attorney, Agent, or Firm* — NSIP Law

(57) ABSTRACT

Provided is a data transmitting method for providing a machine type communication (MTC) service in a mobile communication system. The method includes subscribing, by the MTC device, to a multicast service, and recognizing, by the MTC device, at least one wirelessly announced multicast service and performing joining for a desired multicast service. In cases other than a case in which the MTC device performs the joining to transmit collected data information, the method further includes starting, by a broadcast multicast-service center, a session for the multicast service, performing group paging for at least one MTC device that will receive the multicast service, and transmitting multicast service-related data to the at least one MTC device that will receive the multicast service.

11 Claims, 3 Drawing Sheets

DATA TRANSMITTING METHOD FOR MACHINE TYPE COMMUNICATION SERVICE AND MOBILE COMMUNICATION SYSTEM USING THE SAME

CLAIM FOR PRIORITY

This application claims priority to Korean Patent Application No. 10-2010-0132861 filed on Dec. 22, 2010 in the Korean Intellectual Property Office (KIPO), the entire contents of which are hereby incorporated by reference.

BACKGROUND

1. Technical Field

Example embodiments of the present invention relate in general to a data transmitting method for a machine type communication (MTC) service in which efficient data transmission and reception are performed to provide an MTC service in which a number of concurrent services are requested, and a mobile communication system using the same.

2. Related Art

MTC or machine-to-machine (M2M) communication is a form of data communication which involves one or more entities that do not necessarily need human interaction. A service optimized for MTC differs from a service optimized for human-to-human communication. In comparison with a current mobile network communication service, the MTC service can be characterized by a) several market scenarios, b) data communications, c) lower cost and less effort, d) a potentially very large number of communicating terminals, e) a wide service area, and f) very small traffic per terminal.

MTC may appear in various service forms. An MTC scheme is a primary issue in the fields of remotely controlling gas metering or water metering known as smart metering, tracking and tracing, remote maintenance and control of, for example, vending machines, distribution management, remote monitoring of machines and equipment, healthcare, person tracing, water quantity or water analysis, etc.

With the development of such an MTC scheme, highly advanced multimedia services such as a smart security service or a social safety net system, and various services requiring transmission and reception of aperiodic information, which are differentiated from existing services of simply sensing data and transmitting only a small amount of data, are increasing.

Lately, 3GPP has also been working on MTC standardization for intelligent communication between a human and an object and between objects. However, since discussion of use examples and some solutions is still in a preliminary phase, there remain many problems to be solved.

In particular, if a great amount of multimedia data is simultaneously generated in an MTC environment in which a great number of terminals or devices communicate with one another, a load of network increases, which may cause delay of data transmission and congestion of the network. Accordingly, there is a need for a solution to such problems.

SUMMARY

Accordingly, Example embodiments of the present invention are provided to substantially obviate one or more problems due to limitations and disadvantages of the related art.

Example embodiments of the present invention provide a data transmitting method for a machine type communication (MTC) service, which uses a multicast service scheme provided in an existing mobile communication system for services in which a great number of terminals or devices simultaneously transmit or receive a great amount of multimedia data, and a mobile communication system using the same.

In some example embodiments, a data transmitting method for providing an MTC service in a mobile communication system including at least one MTC device includes subscribing, by the MTC device, to a multicast service provided by the mobile communication system; and recognizing, by the MTC device, at least one wirelessly announced multicast service and performing joining a desired multicast service, and further includes: in cases other than a case in which the MTC device performs the joining to transmit collected data information, starting a session for the multicast service; performing group paging for at least one MTC device that will receive the multicast service; and transmitting multicast service-related data to the at least one MTC device that will receive the multicast service.

The data transmitting method may further include: in the case in which the MTC device performs the joining to transmit collected data information, transmitting, by the MTC device, the collected data information to a network; and performing, by the MTC device, service leaving.

The at least one MTC device may be included in at least one multicast group.

The data transmitting method may further include: stopping the session if there is no data transmission or reception for a certain period of time after transmitting multicast service-related data to the at least one MTC device that will receive the multicast service; and releasing, by the MTC device, resources as the session stops.

The data transmitting method may further include: if the MTC device desires to stop reception of the multicast service, performing service deactivation to leave the joined multicast service.

The data transmitting method may further include: announcing at least one multicast service identified by a unique identifier, the multicast service being provided by the network, after the MTC device subscribes to the multicast service.

The at least one multicast service may include at least one of a periodic status information request for an MTC service and an over the air (OTA) function for remote maintenance of the MTC device.

In other example embodiments, a mobile communication system that provides an MTC service includes: at least one MTC device configured to subscribe to a multicast service, recognize at least one wirelessly announced multicast service, and perform joining for a desired multicast service; a broadcast multicast-service center configured to start a session for the multicast service and announce the start of the session as the MTC device performs joining for the service; and a mobility management entity configured to receive a notification of the session start from the broadcast multicast-service center, recognize a position of an MTC device belonging to a group that will receive the multicast service, and trigger paging for a base station in the position.

The mobile communication system may further include a base station configured to receive a paging message from the mobility management entity and perform group paging for at least one device that will receive the multicast service.

The broadcast multicast-service center may stop the session if there is no data to be transmitted in relation to the multicast service for a previously set period of time.

The MTC device may release resources allocated to the session when the session stops, and perform service deactivation to leave the joined multicast service when the MTC device desires to stop reception of the multicast service.

After the MTC device subscribes to the multicast service, the broadcast multicast-service center may announce at least one multicast service identified by a unique identifier.

In still other example embodiments, an MTC device, which communicates with a base station included in a mobile communication network providing an MTC service, subscribes to a multicast service, recognizes at least one multicast service announced through the base station, performs joining a desired multicast service, receives paging from the base station, and receives data related to the desired multicast service through the base station after the paging.

If the MTC device performs the joining to transmit collected data information, the MTC device may transmit the collected data information to a network directly after the joining, and perform service leaving.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
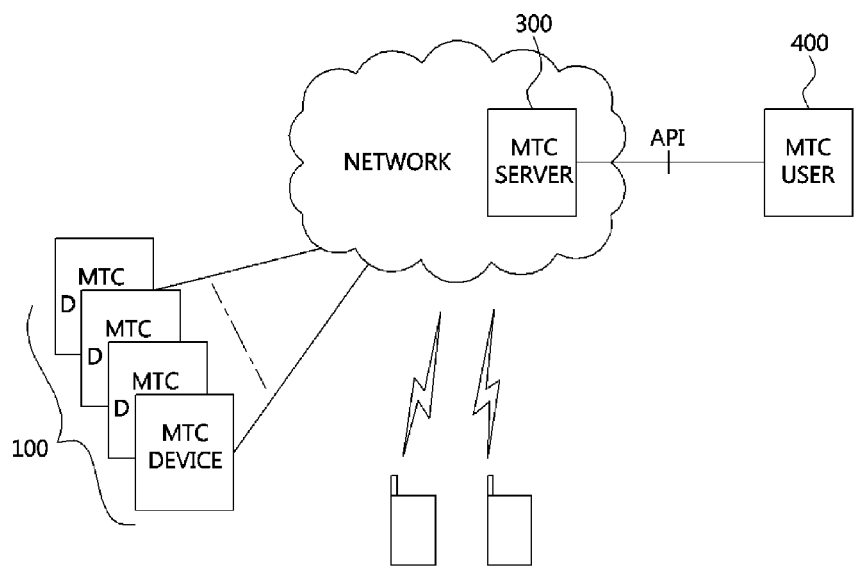
FIG. 1 illustrates an example embodiment of a mobile communication network providing a machine type communication (MTC) service to which the present invention may be applied.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A "terminal" used in this disclosure may be referred to as mobile station (MS), user equipment (UE), user terminal (UT), wireless terminal, access terminal (AT), subscriber unit, subscriber station (SS), wireless device, wireless communication device, wireless transmit/receive unit (WTRU), mobile node, mobile or the like. Various example embodiments of the terminal may include a cellular telephone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback appliance having a wireless communication function, an Internet appliance having wireless Internet accessing and browsing functions, and a portable unit or terminal having a combination of such functions, but are not limited thereto.

A "base station" used in this disclosure generally refers to a stationary point that communicates with a terminal. The base station may be referred to as node-B, eNode-B, a base transceiver system (BTS), an access point, or the like.

In example embodiments of the present invention, a multicast service scheme provided in an existing mobile communication system is used for services in which a great number of terminals or devices simultaneously transmit or receive a great amount of multimedia data.

The multicast service is a scheme of simultaneously transmitting data packets to a number of users, which can prevent waste of network resources caused by overlapping transmission of data since the data is transmitted to users belonging to the same multicast group at once.

In particular, in a mobile communication system requiring expensive radio resources, resources required for data transmitted to a certain level of users in the same cell are shared for high efficiency of the resources.

As an example of the multicast service, a 3GPP system supports multimedia broadcast/multicast service (MBMS) so that a number of users share resources and use multimedia service at a low cost.

FIG. 1 illustrates an example embodiment of a mobile communication network providing a machine type communication (MTC) service to which the present invention may be applied.

As shown in FIG. 1, the mobile communication network providing an MTC service further includes an MTC server 300 for providing the MTC service, MTC devices 110, and an MTC user 400, in addition to an existing mobile communication network.

The MTC device 110 is a terminal having an MTC communication function of communicating with the MTC server 300 and the other MTC devices via a public land mobile network (PLMN).

The MTC server 300 communicates with the PLMN, and communicates with the MTC device 110 via the PLMN. The MTC server 300 also has an interface accessible to the MTC user 400, and provides services for the MTC user 400. The MTC user 400 uses the services provided by the MTC server 300.

In the architecture of FIG. 1, the MTC server 300 is controlled by a network operator, which provides an application programming interface (API) to the MTC server, and the MTC user 400 accesses the MTC server 300 of the network operator via the API.

Meanwhile, the MTC server is included in a network operator domain in FIG. 1. Alternatively, the MTC server is not located in the network operator domain, but may be located outside the network operator domain. In this case, the MTC server is not controlled by the network operator.

Figure 2:
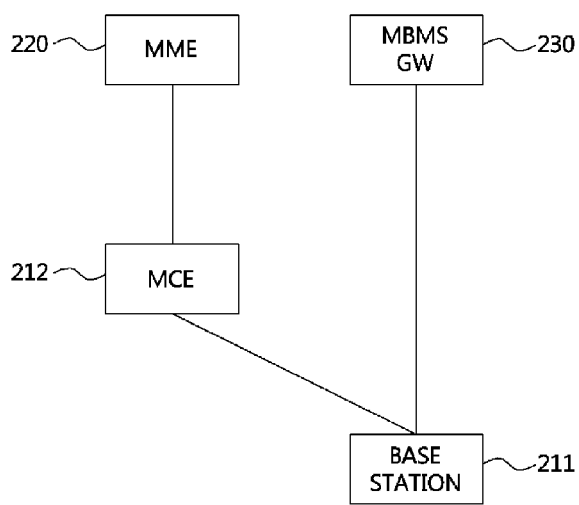
FIG. 2 illustrates an example embodiment of multimedia broadcast/multicast service (MBMS) architecture to which the present invention may be applied.

FIG. 2 illustrates an example embodiment of MBMS architecture to which the present invention may be applied.

The MBMS architecture to which the present invention may be applied may include a mobility management entity (MME) 220, an MCE 212, an MBMS gateway (GW) 230, and a base station 211, as shown in FIG. 2.

The MME 220 is a control node for processing signaling between a terminal (user equipment) and a core network (CN). Primary functions of the MME 220 include bearer management-related functions and connection management-related functions.

The MCE 212 serves to allocate radio resources that are used by all base stations in a multicast broadcast single frequency network (MBSFN) area for multi-cell MBMS transmission using admission control and MBSFN operation. Here, the MBSFN refers to a scheme of transmitting a common signal synchronized in terms of time for a certain period of time from a plurality of cells. With the MBSFN scheme, mobile communication nodes (or cells) in a certain area simultaneously transmit multicast broadcast traffic or control data using the same radio resources. An area including one or a number of cells where MBSFN transmission is performed is defined as an MBSFN area.

When radio resources are not sufficient for an MBMS service, the MCE 212 determines that a radio bearer of a new MBMS service is not set, including allocation of time/frequency radio resources as well as, for example, a function of determining details of a radio configuration such as modulation and coding schemes. The MCE 212 is involved in MBMS session control signaling. The MCE 212 may function as part of another network entity rather than the independent entity as shown in FIG. 2.

The MBMS GW 230 serves to transmit or broadcast MBMS packets to each base station that will transmit a multicast broadcast service. The MBMS GW 230 may function as part of another network entity, similar to the MCE 212.

Figure 3:
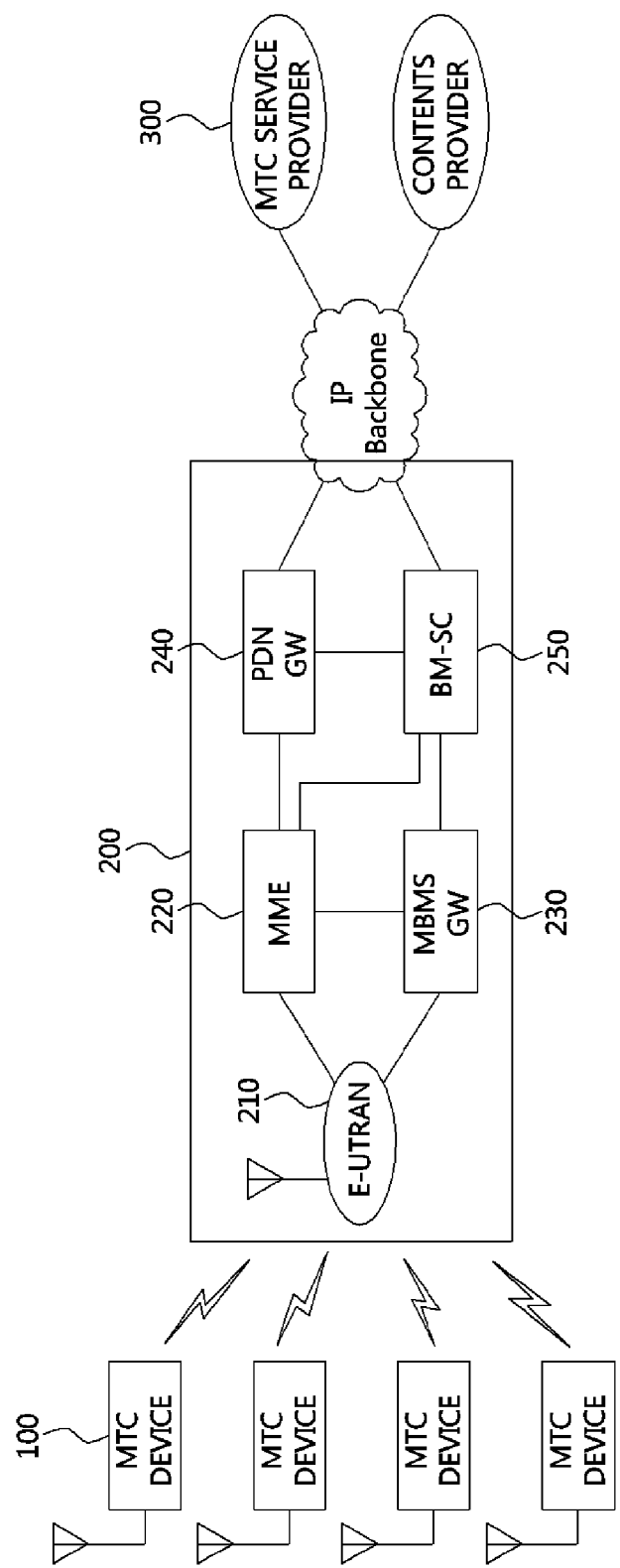
FIG. 3 illustrates a configuration of a mobile communication system when support of an MTC service and a multicast service is considered according to a preferred example embodiment of the present invention.

FIG. 3 illustrates a configuration of a mobile communication system when support of an MTC service and a multicast service is considered according to a preferred example embodiment of the present invention.

In a mobile communication system supporting MTC according to a preferred example embodiment of the present invention, a number of MTC devices 100 can communicate with a remote server or a user and another MTC device via a network as shown in FIG. 3.

The MTC device 100 is located at an end point and includes a data collection device, a sensor and a communication function in order to support an MTC service. A number of MTC devices may be included in the same multicast group or several different multicast groups. The MTC devices belonging to the same MTC group can simultaneously transmit data via the same link and a shared channel in a radio section.

The MTC device according to a preferred example embodiment of the present invention subscribes to a multicast service, recognizes at least one wirelessly announced multicast service, and joins a desired multicast service.

An MME 220, which is a mobility management entity, is a network node for performing signaling information processing and user authentication processing for data transmission control in the mobile communication network. The MME according to a preferred example embodiment of the present invention receives a notification of session start from a broadcast multicast-service center, recognizes a position of an MTC device belonging to a group that will receive the multicast service, and triggers paging for a base station in the position.

An E-UTRAN 210 is a mobile communication wireless access point node according to a preferred example embodiment of the present invention, and includes a base station that wirelessly communicates with at least one MTC device. A base station according to a preferred example embodiment of the present invention receives a paging message from the MME and performs group paging for at least one device that will receive the multicast service.

A packet data network (PDN) GW 240 is a GW responsible for data transmission in the mobile communication network. The PDN GW 240 is responsible for IP address allocation to a terminal, and quality of service (QoS) execution. The MBMS GW 230 serves to transmit multicast data packets to each base station that will transmit multicast data.

The BM-SC 250 provides a function of supplying or delivering services of a contents provider, and communicates with a server of an MTC service provider to transmit or deliver related data. The BM-SC 250 is a source of MBMS data and is a network entity for managing most content about MBMS-related services. The BM-SC 250 serves to perform data scheduling for each MBMS-related service, perform authentication and verification of the contents provider, and manage user charging information.

The BM-SC 250 according to the preferred example embodiment of the present invention serves to start a session for the multicast service and announce the session start as the MTC device 100 performs service joining.

The MTC service provider 108 is a service provider or a server for controlling and remotely managing the MTC devices 100 and receiving collected data from the MTC device 100 to store and process necessary information and to take appropriate measures. That is, a preferred example embodiment of the MTC service provider may be the MTC server 300 of FIG. 1. The contents provider 109 provides multimedia contents requiring multicast transmission.

In FIG. 3, the E-UTRAN 210, the MME 220, the PDN GW 240, the MBMS GW 230, and the BM-SC 250 are only preferred example embodiments of entities of a general cellular mobile communication system, and components of the present invention are not limited to the entities shown in FIG. 3.

Figure 4:
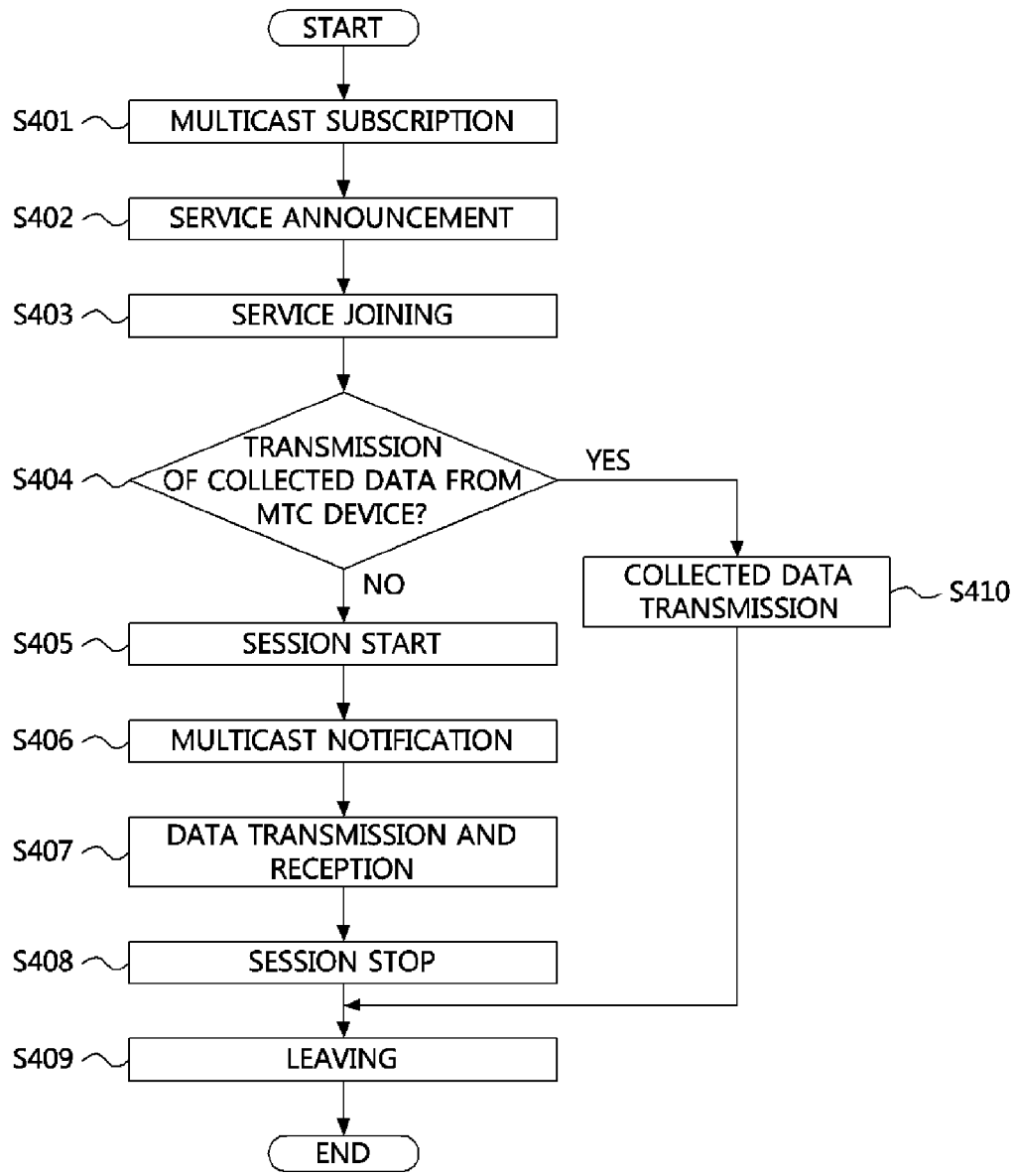
FIG. 4 illustrates an operation flow of an MTC device according to a preferred example embodiment of the present invention.

FIG. 4 illustrates an operation flow of an MTC device according to a preferred example embodiment of the present invention.

For the MTC device to use a general multicast service, a multicast group subscribing, joining, and leaving procedure of the MTC device is necessary.

The MTC device 100 is registered in a server of the BM-SC 250 through a subscription process (S401). This procedure is a basic registration process of the MTC device 100 for a multicast service. In general, the subscription is a procedure performed between a user and a service provider, in which a user receives a registration key for multimedia data reception and the user is registered in the BM-SC 250 using the registration key. That is, the MTC device 100 is registered in the server of the BM-SC 250 through the subscription process.

A service announcement procedure (S402), which is performed after the subscription procedure, is a process of transmitting detailed information for a service that is being transmitted or will be transmitted, to users. Through this service announcement procedure, information for the services provided by the MTC service provider is announced.

In this case, the announced services may include various services, such as a periodic status information request and an over the air (OTA) function for remote maintenance of the MTC device, for example, firmware upgrade or device reset. An identifier (ID) will be assigned to each service. Further, such services are only example embodiments of the present invention, and types of announced services are not limited. That is, the types of the announced services are not limited in the example embodiments of the present invention.

The MTC device recognizing the type of the announced service may perform a service joining procedure (S403). The service joining procedure (S403) is a process of delivering an intention indicating that a previously registered user desires to receive the service recognized through the service announcement, to the BM-SC. In this case, the MTC device delivers an ID of the service to the BM-SC so that the BM-SC prepares data transmission. Through this process, the multicast data is transmitted only to an area where the MTC device is located.

Meanwhile, if service joining is performed for one-way data transmission from the MTC device ("Yes" in S404), the MTC device may transmit collected data information directly after the service joining in S403 (S410) and then immediately perform service leaving (S409).

Otherwise, a normal data transmission and reception process is performed after the service joining procedure (S403).

That is, if data transmission for the service is prepared, the MTC service provider informs of session start (S405). The session start is a step of informing that multicast data transmission for the service has been prepared.

The BM-SC being informed of the session start transmits a multicast session start message to the MBMS GW, the E-UTRAN, and the MME so that a process of requesting data transmission and setting a necessary bearer is initiated.

In a multicast notification (MBMS notification) procedure (S406), which is performed after the session start procedure (S405), the E-UTRAN receiving the session start message transmits a notification to the MTC devices through group paging to recognize a cell where a device that will receive the service is located. The MTC devices receiving the notification transmit a response message as a response to the notification to perform a process in which the MTC devices are allocated necessary resources, if necessary. In a subsequent data transmission and reception procedure S407, multicast data transmission and reception is performed.

Then, if the data transmission stops for a certain period of time, the BM-SC may transmit a session stop message for efficient transmission of resources (S408). If the MTC device receives the session stop message, the MTC device may release the resources allocated to the session.

When the MTC device desires to stop reception of the service, the MTC device performs service deactivation to leave the previously joined service (S409).

It will be understood that the components for the MTC system and the components for the multicast service in the preferred example embodiments of the present invention described above can be applied to all MTC components, including several systems that provide a 3GPP MTC service as well as a machine-to-machine (M2M) service.

According to the present invention, the multicast service provided in an existing mobile communication system is used for traffics simultaneously transmitted to several MTC devices. Thus, resources can be efficiently used in the MTC service in which transmission of a great amount of data is required.

While the example embodiments of the present invention and their advantages have been described in detail, it should be understood that various changes, substitutions and alterations may be made herein without departing from the scope of the invention.

What is claimed is:

1. A data transmitting method for providing a machine type communication (MTC) service in a mobile communication system including at least one MTC device, the method comprising:
   subscribing, by the MTC device, to a multicast service provided by the mobile communication system; and
   recognizing, by the MTC device, at least one wirelessly announced multicast service and performing joining a desired multicast service,
   determining, by the MTC device, whether an object of the joining is to transmit collected data transmission,
   further comprising: in cases other than a case in which the MTC device performs the joining to transmit collected data information,
   starting a session for the multicast service;
   performing group paging for the at least one MTC device that will receive the multicast service;
   transmitting, by the MTC device, a response message as a response to the group paging;
   allocating necessary resources to the at least one MTC device; and
   transmitting multicast service-related data to the at least one MTC device that will receive the multicast service,
   further comprising: in a case in which the MTC device performs the joining to transmit the collected data information,
   transmitting, by the MTC device, the collected data information to a network; and
   performing, by the MTC device, service leaving,
   wherein in the case in which there is no data transmission or reception for a certain period of time after transmitting multicast service-related data to the at least one MTC device that will receive the multicast service,
   the session is stopped, and
   the MTC device releases resources as the session is stopped.

2. The data transmitting method of claim 1, wherein the at least one MTC device is included in at least one multicast group.

3. The data transmitting method of claim 1, further comprising:
   in case in which the MTC device desires to stop reception of the multicast service, performing service deactivation to leave the joined multicast service.

4. The data transmitting method of claim 1, further comprising: announcing at least one multicast service identified by a unique identifier, the multicast service being provided by the network, after the MTC device subscribes to the multicast service.

5. The data transmitting method of claim 1, wherein the at least one multicast service includes at least one of a periodic status information request for an MTC service and an over the air (OTA) function for remote maintenance of the MTC device.

6. A mobile communication system that provides a machine type communication (MTC) service, the mobile communication system comprising:
 at least one MTC device subscribing to a multicast service, recognizing at least one wirelessly announced multicast service, and performing joining a desired multicast service;
 a broadcast multicast-service center starting a session for the multicast service and announcing the start of the session as the MTC device performs joining the service; and
 a mobility management entity receiving a notification of the session start from the broadcast multicast-service center, recognizing a position of an MTC device belonging to a group that will receive the multicast service, and triggering a paging for a base station corresponding the position of the MTC device;
 a base station receiving a paging message from the mobility management entity and performing group paging for at least one device that will receive the multicast service, receiving a response message as a response to the group paging and allocating necessary resources to the device that will receive the multicast service,
 wherein, in a case in which there is no data to be transmitted in relation to the multicast service for a previously set period of time, the broadcast multicast-service center stops the session, and the MTC device releases resources allocated to the session and performs service deactivation to leave the joined multicast service,
 wherein in a case in which the MTC device performs the joining to transmit collected data information, the MTC device transmits the collected data information to a network, and performs service leaving.

7. The mobile communication system of claim 6, further comprising a base station receiving a paging message from the mobility management entity and performing group paging for at least one device that will receive the multicast service.

8. The mobile communication system of claim 6, wherein the MTC device performs service deactivation to leave the joined multicast service when the MTC device desires to stop reception of the multicast service.

9. The mobile communication system of claim 6, wherein, the broadcast multicast-service center announces at least one multicast service identified by a unique identifier after the MTC device subscribes to the multicast service.

10. A machine type communication (MTC) device that communicates with a base station included in a mobile communication network providing an MTC service,
 wherein the MTC device subscribes to a multicast service, recognizes at least one multicast service announced through the base station, performs joining for a desired multicast service, determines whether an object of the joining is to transmit collected data transmission, receives paging from the base station, transmits a response message to be allocated necessary resources, and receives data related to the desired multicast service through the base station after the paging,
 in a case in which there is no data reception for a certain period of time after receiving the data related to the desired multicast service, the MTC device releases resources, and
 wherein, in a case in which the MTC device performs the joining to transmit the collected data information, the MTC device transmits the collected data information to a network directly after the joining, and performs service leaving.

11. The MTC device of claim 10, wherein the MTC device is included in at least one multicast group.

* * * * *